(12) United States Patent
Bregman et al.

(10) Patent No.: US 11,729,051 B2
(45) Date of Patent: Aug. 15, 2023

(54) AUTOMATED DEPLOYMENT OF CONTROL NODES AT REMOTE LOCATIONS

(71) Applicant: RED HAT, INC., Raleigh, NC (US)

(72) Inventors: Arie Bregman, Gan Yavne (IL); Steve Mattar, Herzliya (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/574,075

(22) Filed: Jan. 12, 2022

(65) Prior Publication Data
US 2023/0224212 A1  Jul. 13, 2023

(51) Int. Cl.
G06F 15/177 (2006.01)
H04L 41/0806 (2022.01)
H04L 41/0866 (2022.01)
H04L 41/08 (2022.01)
H04L 41/084 (2022.01)

(52) U.S. Cl.
CPC ...... *H04L 41/0806* (2013.01); *H04L 41/0843* (2013.01); *H04L 41/0866* (2013.01); *H04L 41/0886* (2013.01)

(58) Field of Classification Search
CPC ............. H04L 41/0806; H04L 41/0843; H04L 41/0866; H04L 41/0886
See application file for complete search history.

(56) References Cited

U.S. PATENT DOCUMENTS 11,153,155 B1 * 10/2021 Perez ................. H04L 41/0886
2003/0009754 A1    1/2003 Rowley et al.
2020/0344115 A1 * 10/2020 Power ................. H04L 41/0809
2020/0344120 A1   10/2020 Pianigiani et al.
2020/0344135 A1 * 10/2020 Guo ..................... H04L 41/0895
2021/0176123 A1 *  6/2021 Plamondon ......... H04L 41/0843

FOREIGN PATENT DOCUMENTS

| CN | 106487542 A | * | 3/2017 |
| CN | 106713379 A |   | 5/2017 |
| CN | 113568624 A |   | 10/2021 |
| WO | 2016130700 A1 | | 8/2016 |

OTHER PUBLICATIONS

Extended European Search Report and Written Opinion for EP Appln. No. 22162448.9 dated Sep. 8, 2022.
"Installing Ansible," Red Hat release, Dec. 2021.

* cited by examiner

*Primary Examiner* — Richard G Keehn
(74) *Attorney, Agent, or Firm* — IKilpatrick Townsend & Stockton LLP

(57) ABSTRACT

A control node can be automatically deployed at a remote location according to some examples described herein. In one example, a system can automatically set up a control node at a remote location by performing various operations. The operations can include interacting with the remote location to deploy an instance of the control node at the remote location. The operations can include providing a configuration script to the remote location for use by the instance in configuring one or more managed nodes. The operations can include providing connection information to the remote location for use by the instance in establishing a network connection to the one or more managed nodes. The system can then initiate a configuration process in which the control node establishes the network connection to the one or more managed nodes and then configures the one or more managed nodes in accordance with the configuration script.

20 Claims, 9 Drawing Sheets

US 11,729,051 B2

AUTOMATED DEPLOYMENT OF CONTROL NODES AT REMOTE LOCATIONS

TECHNICAL FIELD

The present disclosure relates generally to control nodes usable in computing environments. More specifically, but not by way of limitation, this disclosure relates to automated deployment of control nodes at remote locations.

BACKGROUND

Distributed computing environments such as cloud computing environments and computing clusters have recently grown in popularity. These computing environments can include large numbers of nodes (e.g., physical or virtual machines) for use in performing various computing tasks. Given the complexity of some distributed computing environments, automation frameworks have been developed that help manage them more efficiently. These automation frameworks can help to automate the deployment, configuration, and management of various aspects of a distributed computing environment.

One popular automation framework is Ansible by Red Hat®. Ansible is a software tool that can assist with deploying applications, updating workstations and servers, cloud provisioning, configuration management, and many other functions for systems administrators. In Ansible, there are two categories of computers: control nodes and managed nodes. A control node generally runs Ansible and manages the managed nodes. A managed node can be any computing device that is managed by the control node. The control node can transmit small software programs called "modules" to the managed nodes, which can run the modules. When executed, the modules can configure the managed nodes to conform to a target state. Once they finish executing, the modules can be removed from the managed nodes. In this way, the modules can be temporarily stored on the managed nodes for the duration of time in which they execute and then removed.

In Ansible, the modules provide a means to accomplish a desired automation task, but the way in which the modules are used is governed by a "playbook." A playbook is a configuration file drafted in a human-readable language that provides instructions for what needs to be done to transform a managed node into a target state. Playbooks are typically written in a YAML Ain't Markup Language (YAML) format, though other formats are possible.

DETAILED DESCRIPTION

Figure 1:
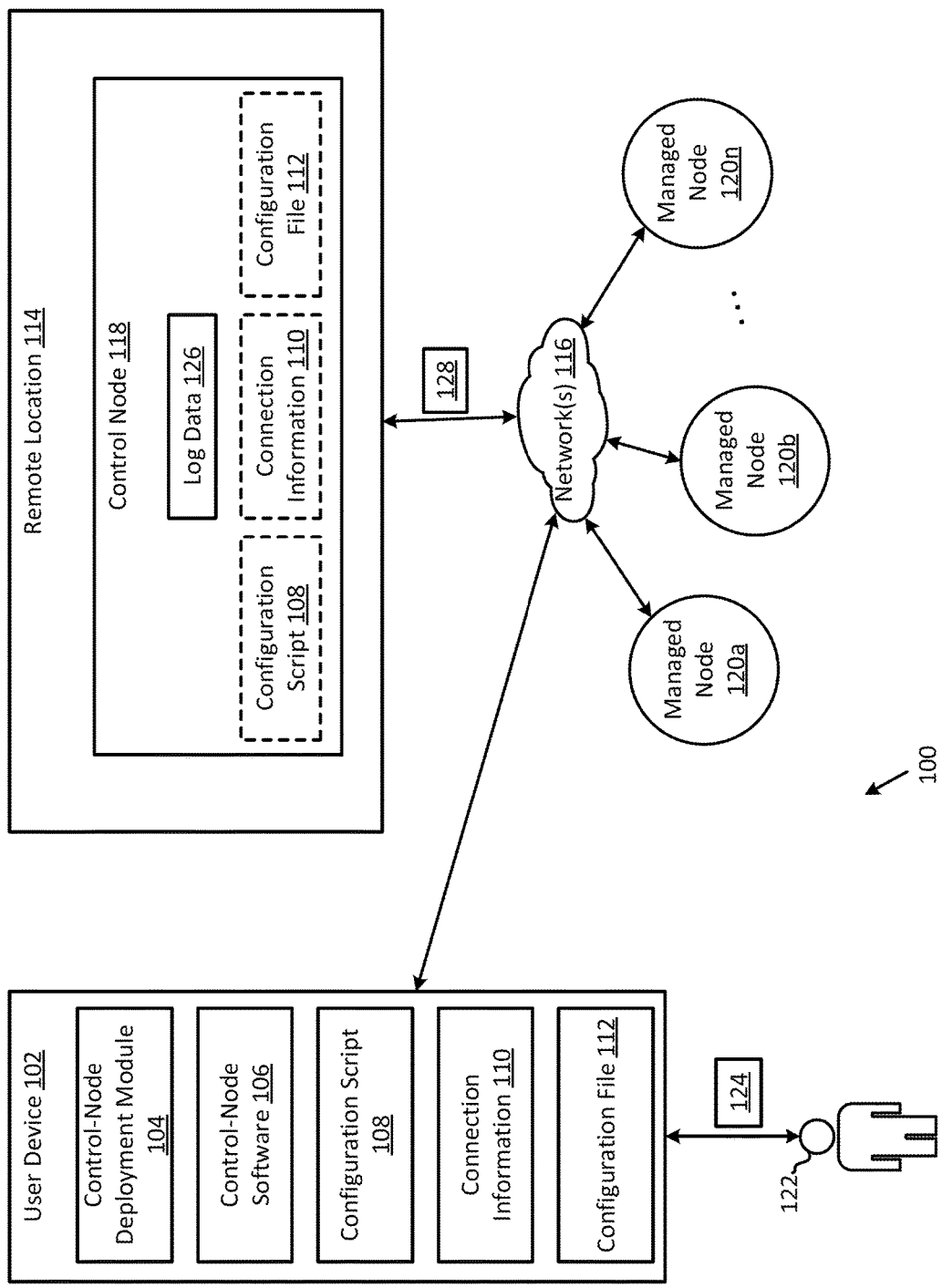
FIG. 1 is a block diagram of an example of a system for automatically deploying a control node to a remote location according to some aspects of the present disclosure.

Some automation frameworks (e.g., Ansible) involve a control node and one or more managed nodes. A control node can be any physical or virtual machine that is configured to manage a managed node. A managed node can be any physical or virtual machine that is managed by a control node. In some cases, the control node can manage the managed nodes by configuring them so that they conform to a target state. This configuration process may involve the control node transmitting commands or modules to the managed nodes for installing operating systems, applications, and other software on the managed nodes and configuring the settings thereof.

Often times, a system administrator uses their own computer as the control node. To do so, the system administrator manually downloads and installs the control-node software (e.g., Ansible) on their computer, provides the configuration files for use in configuring the control-node software itself, provides connection information for use by the control node in connecting to the managed nodes, and provides a configuration script such as a playbook for use by the control node in managing the managed nodes. The system administrator may also need to provide other data to implement the control node. This manual process can be time consuming and tedious. And once the control node is deployed, it executes on the system administrator's own computer, consuming that computer's resources (e.g., CPU, RAM, storage, and network resources). This may prevent that computer from being used for other processes, or may negatively impact other processes executing on the computer. If the system administrator decides to use a different computer as the control node instead, the system administrator may need to manually perform these operations all over again.

Some examples of the present disclosure can overcome one or more of the abovementioned problems by automatically deploying a control node at a remote location selected by a user, such as a system administrator. For example, a user can have a user device, such as a laptop computer, a desktop computer, or a tablet. The user device can include a control-node deployment module (CNDM). The user can input a remote location to the CNDM, where the remote location can be any location that is separate from the user device. One example of the remote location can be a distributed computing environment that is separate from the user device. Based on the input, the CNDM can then cause the control-node software to be downloaded to and installed at the remote location. The CNDM can also provide the remote location with connection information for use by the control node in connecting to one or more managed nodes, a configuration file for configuring the control node, and a configuration script for use by the control node in managing the managed nodes. The remote location can use the control-node software to deploy an instance of the control node having settings that are configured in accordance with the configuration file. Once deployed at the remote location, the control node can then connect to the managed nodes using the connection information and execute the configuration script to manage one or more aspects of the managed nodes. In this way, the control node can be rapidly and easily deployed at the remote location using the CNDM.

In some examples, the control node at the remote location can generate log data based on its management of the one or more managed nodes. For example, as the control node executes the configuration script to configure the managed nodes, the control node can log one or more events that occur. The control node can transmit (e.g., in real time) the log data back to the user device, so that the user can easily monitor the control node's management activities. By transmitting the log data back to the user device, the user can still monitor the control node's management activities, even though they have been offloaded to the remote location.

In some examples, the user may decide to move the control node from a first remote location to a second remote location. To do so, the user can use the CNDM. For example, the user can input a second remote location that is to execute the control node. Based on the input, the CNDM can transmit the control-node software, connection information, configuration file, and configuration script to the second remote location and initiate deployment of a new instance of the control node at the second remote location. Once the control node is deployed at the second remote location, the CNDM can transmit commands to the first remote location for causing the first remote location to shut down the currently running instance of the control node and remove any files associated therewith. Removing said files can conserve memory and storage space at the first remote location. By waiting until after the control node is deployed at the second remote location before shutting down the control node at the first remote location, execution gaps may be avoided. This can allow the managed nodes to be managed in a relatively continuous manner.

In some examples, the CNDM may automatically move the control node from a first remote location to a second remote location based on one or more events at the first remote location. For example, the CNDM may receive an indication that the first remote location is low on memory, processing power, or other computing resources. In response to receiving the indication, the CNDM can initiate a transfer of the control node from the first remote location to the second remote location. This may help free up computing resources at the first remote location for use in other tasks. The transfer may be effectuated in the manner described above.

In some examples, the user device may serve as an intermediary between the control node and the managed nodes (e.g., rather than the control node more directly managing the managed nodes). For example, the control node can transmit control data to the user device based on the configuration script. The user device can receive the control data and forward it to the managed nodes. Because the control node need not be connected to the managed nodes in this arrangement, the connection information may not be transmitted to the remote location. This can improve the security of the system because sensitive information, such as authentication data for authenticating with the managed nodes, may be maintained on the user device rather than being transmitted to and stored at the remote location.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for automatically deploying control nodes at remote locations according to some aspects of the present disclosure. The system 100 includes a user device 102, such as a laptop computer, a desktop computer, or a tablet. The user device 102 can be operable by a user 122, such as a system administrator, to automatically deploy a control node at a remote location 114.

More specifically, the user device 102 can include a control-node deployment module (CNDM) 104 configured to assist in automatically deploying a control node 118 at a remote location 114. The CNDM 104 can receive input 124 from a user 122 indicating a remote location 114 at which the control node 118 is to be deployed. For example, the user input may specify a name or internet protocol (IP) address of the remote location 114. The remote location 114 can be, or include, any computing device that is separate from the user device 102. In some examples, the remote location 114 may correspond to a distributed computing environment, such as a cloud computing environment. Based on receiving the input 124, the CNDM 104 can initiate a deployment process for automatically deploying a control node 118 at the remote location 114.

In some examples, the deployment process can involve the CNDM 104 transmitting control-node software 106 to the remote location 114 via one or more networks 116, such as a local area network or the Internet. The control-node software 106 is the underlying software for the control node 118. In some examples, the control-node software 106 is a binary file that is executable to deploy an instance of the control node 118 in the computing environment. In other examples, the control-node software 106 is source code, which can be compiled into a binary file and executed to deploy an instance of the control node 118 in the computing environment. This compilation may occur on the user device 102 or at the remote location 114. Either way, the control-node software 106 can define the program logic for the control node 118. Transmitting the control-node software 106 to the remote location 114 can allow the remote location 114 to deploy an instance of the control node 118.

In some examples, the deployment process may also involve the CNDM 104 transmitting a configuration file 112 to the remote location 114 via the one or more networks 116. The configuration file 112 can include settings for control node 118. Examples of the settings can include values for environment variables. Transmitting the configuration file 112 to the remote location 114 can allow the remote location 114 to configure the control node 118 in accordance with the settings in the configuration file 112. This configuration may occur at any suitable time, such as before the control node 118 starts up, during its startup process, or after its startup process.

In some examples, the deployment process may also involve the CNDM 104 transmitting a configuration script 108 to the remote location 114 via the one or more networks 116. An example of the configuration script 108 can include an Ansible playbook. The configuration script 108 can include instructions for configuring one or more managed nodes 120a-n. The instructions can be written in a human-readable format, such as YAML or JSON format, and can be interpreted by the control node 118. Transmitting the configuration script 108 to the remote location 114 can allow the control node 118 to configure the managed nodes 120a-n in a desired manner.

In some examples, the deployment process may also involve the CNDM 104 transmitting connection information 110 to the remote location 114 via the one or more networks 116. The connection information 110 can include any suitable information for establishing a network connection with the managed nodes 120a-n. Examples of the connection information 110 can include an identifier (e.g., name or IP address) of each managed node and authentication data for each managed node. Transmitting the connection information 110 to the remote location 114 can allow the control node 118 to establish a network connection to the managed nodes 120a-n, so that the control node 118 can communicate with the managed nodes 120a-n.

Once the CNDM 104 has transmitted some or all of the abovementioned items to the remote location 114, the CNDM 104 can transmit one or more commands to the remote location 114 for causing the remote location 114 to deploy an instance of the control node 118. The instance can be deployed using the control-node software 106 and configured using the configuration file 112. Once deployed, the control node 118 can establish a network connection (e.g., via the one or more networks 116) to the managed nodes 120a-n using the connection information 110. The managed nodes 120a-n may be part of a distributed computing environment that also includes the control node 118, or the managed nodes 120a-n may be part of a distributed computing environment that excludes the control node 118.

After establishing the network connection to the managed nodes 120a-n, the control node 118 can execute the configuration script 108 to configure the managed nodes 120a-n. This may involve the control node 118 transmitting control data 128 (e.g., control commands or control modules) to the managed nodes 120a-n. The control data 128 may be configured to adjust the configuration of the managed nodes 120a-n to achieve a target state defined by the configuration script 108.

In some examples, the managed nodes 120a-n may be part of a distributed computing environment usable by one or more users to perform computing tasks. For example, the remote location 114 can be a cloud computing environment to which multiple users may have paid subscriptions. In this example, the managed nodes 120a-n can provide the cloud resources to the users. That is, the managed nodes 120a-n can provide their computing resources on demand to the users, to allow the users to perform one or more computing tasks in the cloud computing environment. In some such examples, the control node 118 may be dedicated to managing the managed nodes 120a-n and therefore the computing resources of the control node 118 may not be part of the resource pool available to the users.

In some examples, the control node 308 can generate log data 126. The log data 126 can indicate events relating to the management of the control nodes 308. For example, the log data 126 can indicate that some or all of the configuration process defined by the configuration script 108 succeeded or failed for a given managed node. As another example, the log data 126 can indicate that one or more events occurred on the managed nodes 120a-n. The control node 308 can then transmit the log data 126 to the user device 102. This may allow the user 122 to stay updated about the management activities.

Although FIG. 1 shows a certain number and arrangement of components, this is intended to be illustrative and non-limiting. Other examples may include more components, fewer components, different components, or a different arrangement of the components shown in FIG. 1. For instance, the user device 102, the control node 118, the managed nodes 120a-n, or any combination of these may be part of the same distributed computing environment in another example.

Figure 2:
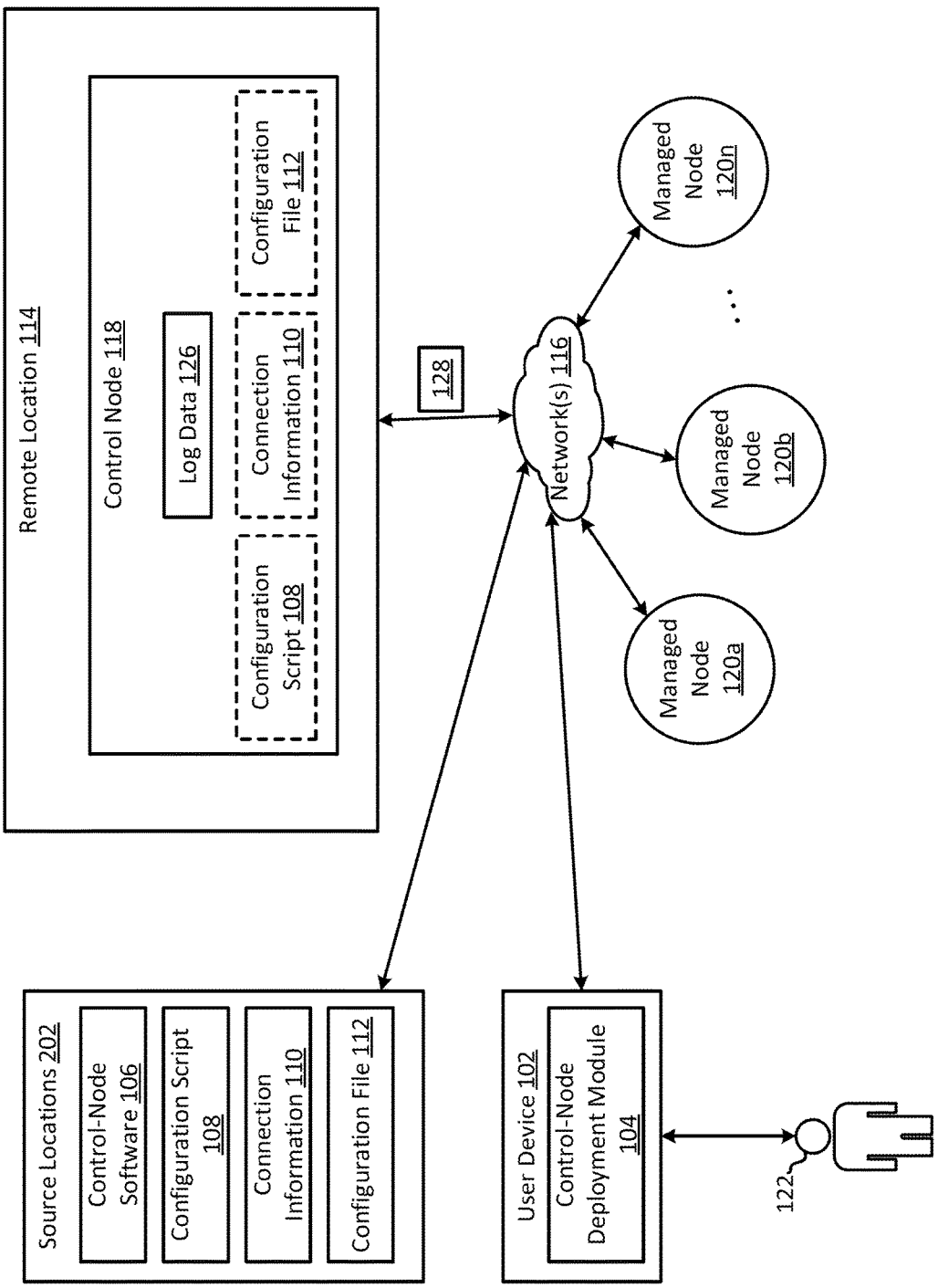
FIG. 2 is a block diagram of an example of a system for automatically deploying a control node to a remote location in which various items are stored at source locations other than a user device according to some aspects of the present disclosure.

One example of an alternative system configuration is shown in FIG. 2. As shown, one or more items (e.g., the control-node software 106, configuration script 108, connection information 110, and configuration file 112) can be stored at one or more locations, referred to herein as source locations 202, that are distinct from the user device 102. Examples of the source locations 202 can include websites, repositories, servers, databases, or any combination of these. In some such examples, the user device 102 can command the remote location 114 to download some or all of those items from the source locations 202. As a result, the user device 102 may be able to exclude some or all of those items and may not transmit those items to the remote location 114. This may help conserve the memory, bandwidth, and processing power of the user device 102.

Figure 3:
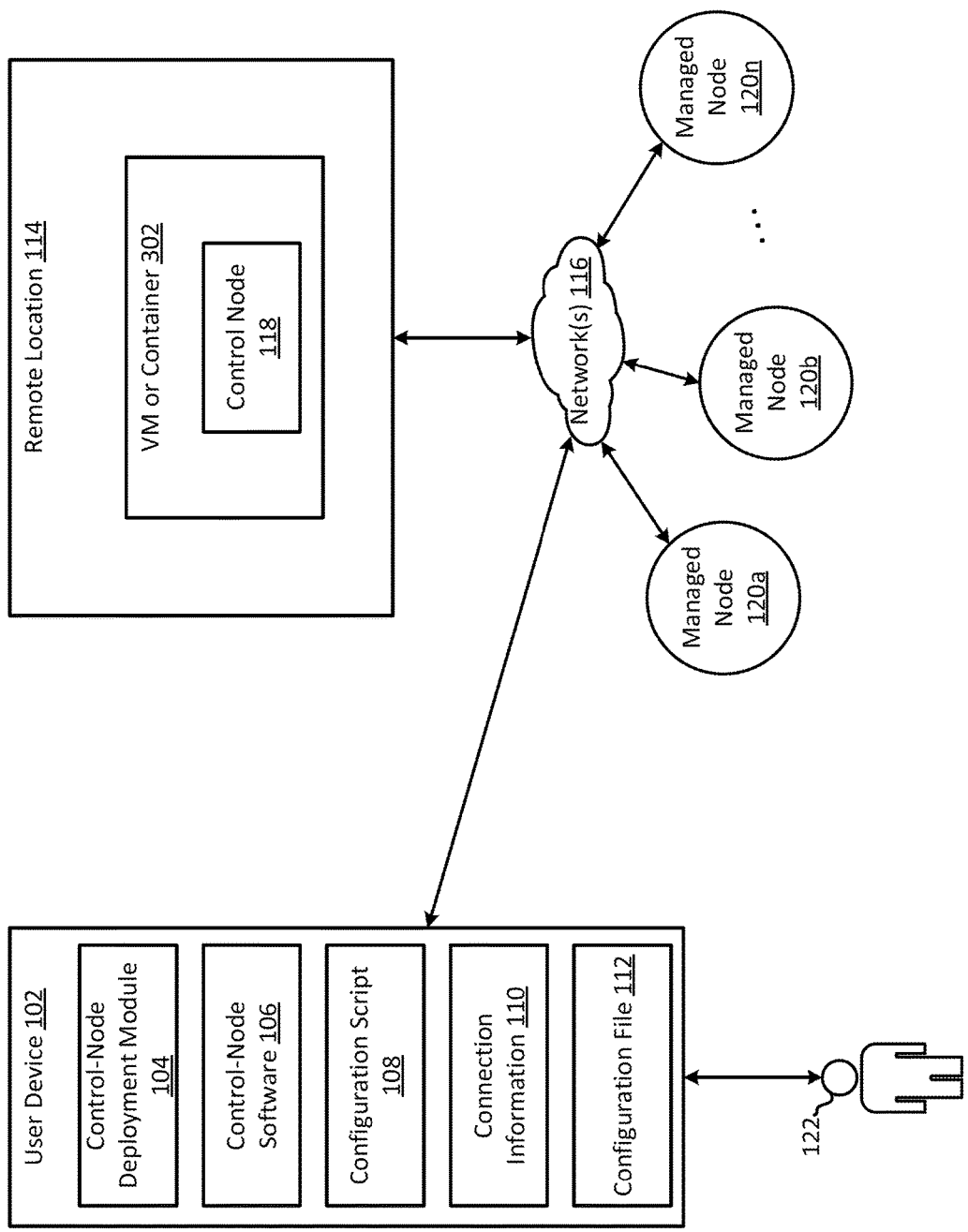
FIG. 3 is a block diagram of an example of a system in which the control node is deployed at the remote location inside a virtual machine or a container according to some aspects of the present disclosure

FIG. 3 shows a block diagram of an example in which the control node 118 is deployed at the remote location 114 inside a virtual machine (VM) or a container 302 according to some aspects of the present disclosure. Virtual machines and containers are different types of relatively isolated virtual environments in which software can execute. Both VMs and containers may be deployed from image files and may include their own isolated operating systems, libraries, and runtime environments. In some examples, the CNDM 104 can interact with the remote location to provision the VM or container 302 and subsequently deploy the control node 118 therein. Alternatively, the control-node software 106 may be stored in an image file that, when run on the remote location 114, automatically deploys the control node 118 within a virtual machine or container 302. In some such examples, transmitting the control-node software 106 to the remote location 114 may involve transmitting the image file containing the control-node software 106 to the remote location 114.

Figure 4:
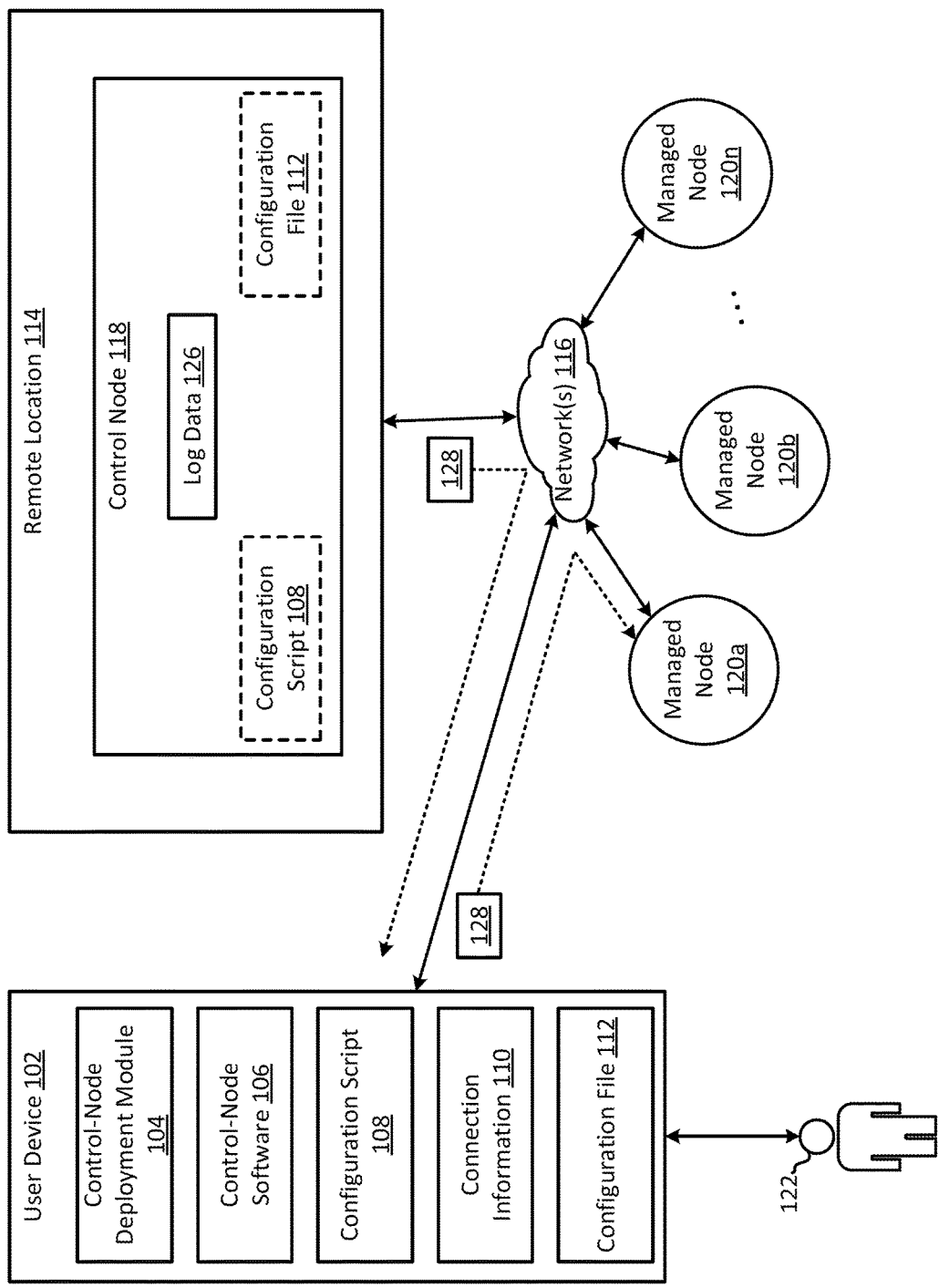
FIG. 4 is a block diagram of an example of a system in which the control node communicates with the managed nodes via the user device according to some aspects of the present disclosure.

FIG. 4 shows a block diagram of an example of a system in which the control node 118 communicates with the managed nodes 120a-n via the user device 102 according to some aspects of the present disclosure. In this example, the user device 102 can serve as an intermediary between the control node 118 and the managed nodes 120a-n. The control node 118 can transmit control data 128 to the user device 102, which can forward the control data 128 to the managed nodes 120a-n. The control data 128 may be generated by the control node 118 based on the configuration file 112. In this example, the control node 118 may exclude the connection information 110 and may not establish a network connection with the managed nodes 120a-n. Instead, the user device 102 may use the connection information 110 to establish the network connection with the managed nodes 120a-n for forwarding the control data 128 thereto. This can improve the security of the system, for example if the connection information 110 includes sensitive information like authentication data, because the sensitive information is maintained on the user device 102 rather than transmitted to the remote location 114.

Figure 5:
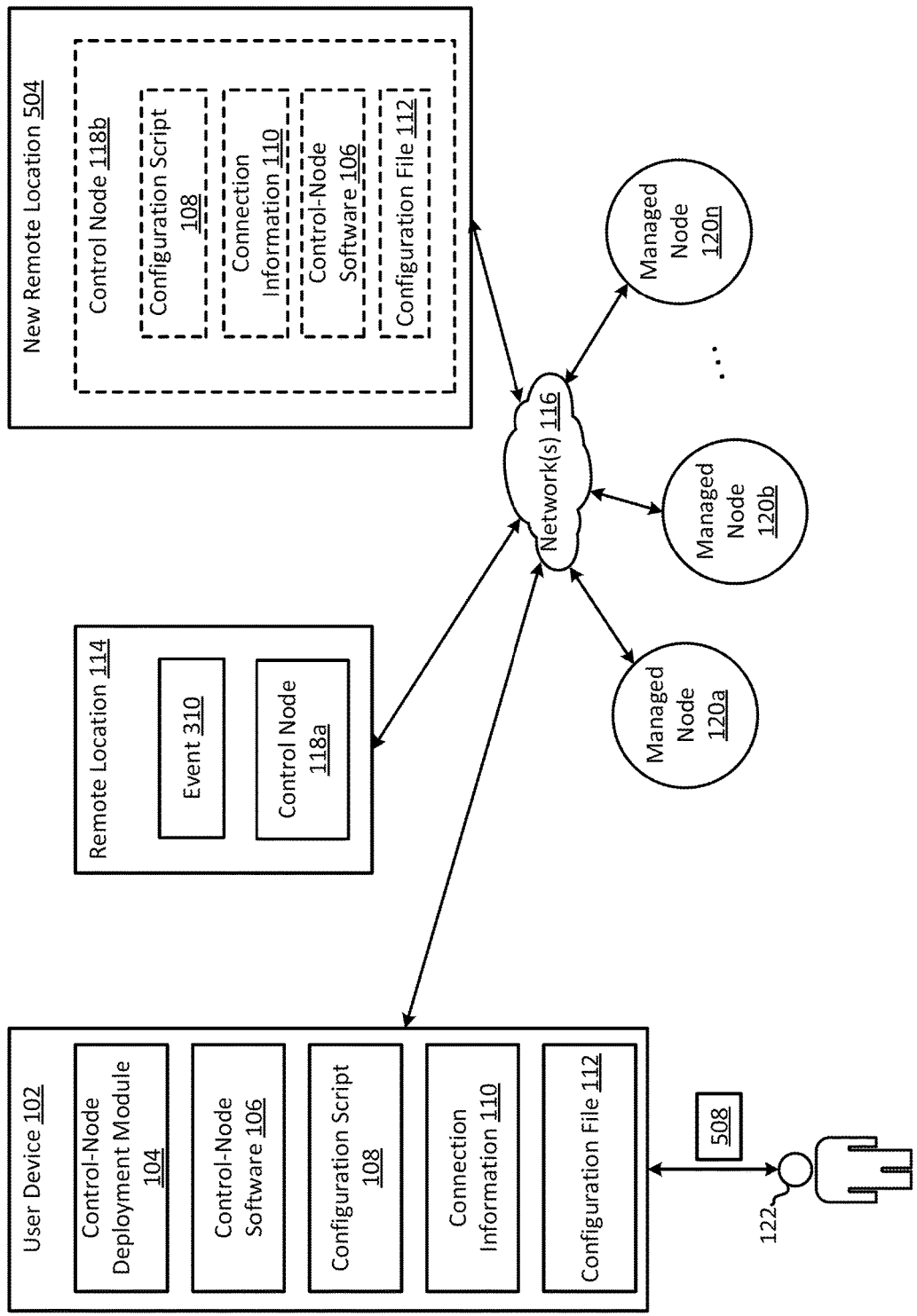
FIG. 5 is a block diagram of an example of a system in which control nodes are deployed at multiple remote locations according to some aspects of the present disclosure.

FIG. 5 shows a block diagram of an example of a system in which control nodes 118a-b are deployed at multiple remote locations 114, 504 according to some aspects of the present disclosure. In this example, the user 122 may provide user input 508 indicating a new remote location 504 to which the control node 118 is to be deployed. Based on the user input 508, the CNDM 104 can perform the deployment process described above with respect to the new remote location 504 to automatically deploy a new instance of the control node 118b at the new remote location 504. For example, the CNDM 104 can transmit the control-node software 106, configuration script 108, connection information 110, and configuration file 112 to the new remote location 504. The CNDM 104 can then transmit one or more commands to the new remote location 504 for causing the new remote location 504 to deploy another instance of the control node 118b.

In some examples, the control nodes 118a-b running at the two remote locations 114, 504 can implement aspects of the configuration script 108 in parallel to one another. For example, the control node 118a can execute the configuration script 108 with respect to one of the managed nodes 120a and the control node 118b can execute the configuration script 108 with respect to another of the managed nodes 120b. As another example, the control node 118a may execute a first portion of the configuration script 108 with respect to a managed node 120a and the control node 118b may execute a second portion of the configuration script 108 with respect to the same managed node 120a. These concepts may be further expanded to apply to any number of control nodes at any number of remote locations. Using multiple control nodes 118a-b to execute such management operations in parallel may expedite the speed at which the management operations are performed and reduce the load on each individual control node.

In some examples, the user device 102 can select the remote location 114 and the new remote location 504 based on their geographical proximities to the managed nodes 120a-n. For example, the remote location 114 and the new remote location 504 may be geographically closer to the managed nodes 120a-n than other candidate remote locations. As a result, the user device 102 may select the remote location 114 and the new remote location 504 to deploy the control nodes 118a-b. This may reduce latency. Additionally or alternatively, the user device 102 can determine how the control nodes 118a-b are to manage the managed nodes 120a-n based on the graphical proximities between the control nodes 118a-b and the managed nodes 120a-n. For example, the user device 102 can configure the control node 118a to manage the managed node 120a based on a geographical distance between the control node 118a and the managed node 120a being less than another geographical distance between the control node 118b and the managed node 120a. As another example, the user device 102 can configure the control node 118b to manage the managed node 120b based on a geographical distance between the control node 118b and the managed node 120b being less than another geographical distance between the control node 118a and the managed node 120b. By selecting the closest control node 118 to manage a particular managed node, latency may be further reduced.

In some examples, the control node 118a running at the remote location 114 may be shutdown after the other control node 118b is deployed at the new remote location 504. For example, the CNDM 104 may receive an indication that the deployment process for the control node 118b at the new location is complete. In response to receiving the indication, the CNDM 104 can transmit a command to the remote location 114 to shutdown the control node 118a and remove any related files (e.g., the control-node software 106, configuration script 108, connection information 110, and configuration file 1120). In this way, the control node 118 can be migrated from the remote location 114 to the new remote location 504 in a manner that prevents management gaps, so that there is substantially continuous management of the managed nodes 120a-b.

In some examples, the control node 118b can be automatically deployed to the new remote location 504 in response to one or more events 310 occurring at the remote location 114. Examples of such events 310 can include the remote location 114 consuming more than a threshold amount of processing power, electrical power, memory, storage space, network bandwidth, or any combination of these. For example, the user device 102 may receive (e.g., periodically) one or more metrics about the remote location 114, such as the amount of available memory, CPU, storage, and network bandwidth at the remote location 114. If one or more of the metrics exceed predefined threshold levels, the CNDM 104 may automatically deploy one or more other instances of the control node 118a at one or more other remote locations, such as new remote location 504. The multiple instances can then operate in parallel, for example to lighten the load on control node 118a. As another example, if one or more of the metrics exceed predefined threshold levels, the CNDM 104 may automatically migrate the control node 118a from the remote location 114 to the new remote location 504, which may have greater computing capacity and may therefore be more capable of handling the load. Migrating the control node from the remote location 114 to the new remote location 504 may free up the remote location 114 to perform other tasks, or may improve the speed at which existing tasks are performed at the remote location 114.

Figure 6:
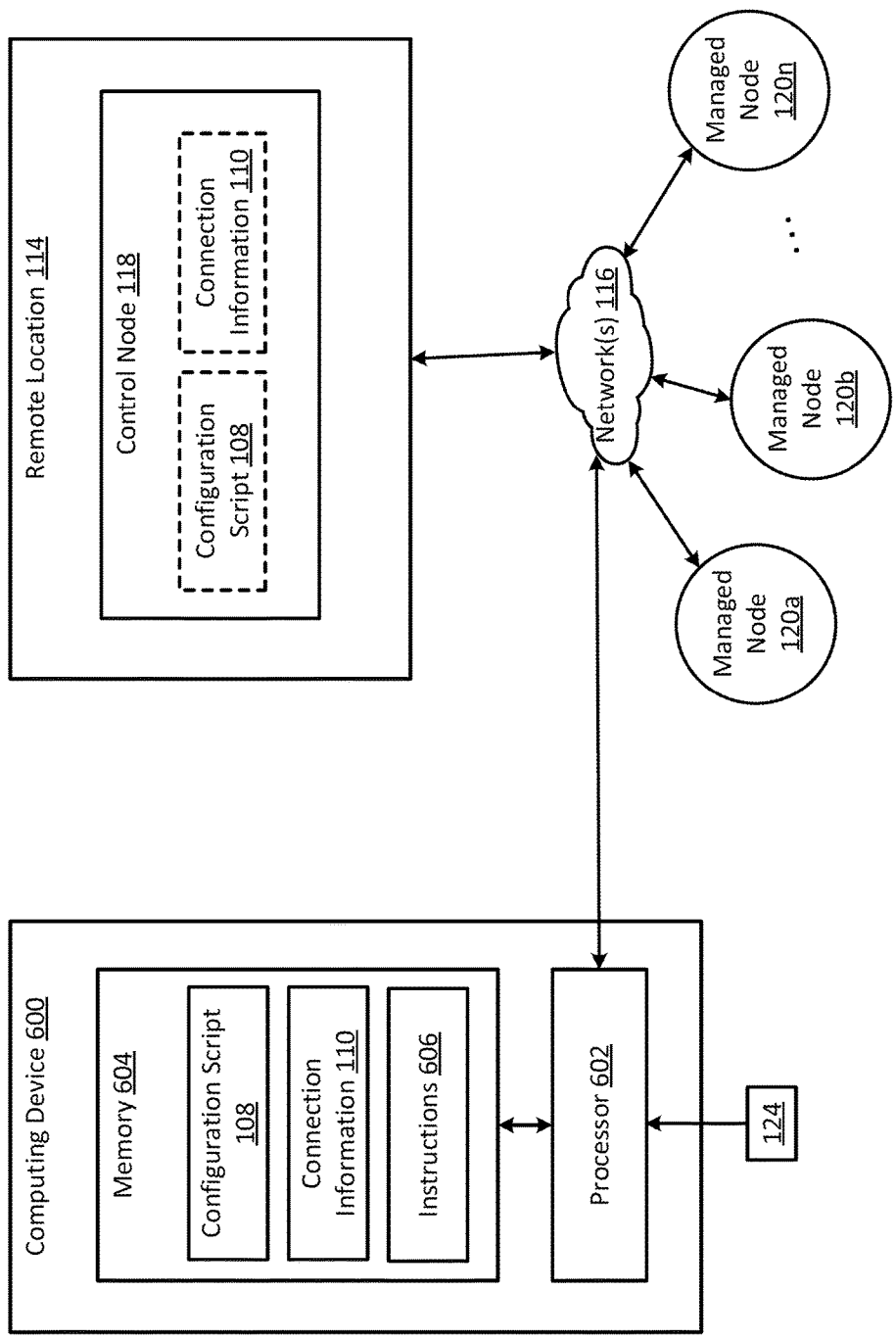
FIG. 6 is a block diagram of an example of a computing device for automatically deploying a control node to a remote location according to some aspects of the present disclosure.

FIG. 6 shows a block diagram of an example of a computing device 600 for automatically deploying a control node 118 to a remote location 114 according to some aspects of the present disclosure. Examples of the computing device 600 can include a laptop computer, a desktop computer, a wearable device, or a tablet. In some examples, the computing device 600 may correspond to the user device 102 of FIG. 1.

The computing device 600 includes a processor 602 communicatively coupled with a memory device 604. The processor 602 can include one processing device or multiple processing devices. Examples of the processor 602 include a Field-Programmable Gate Array (FPGA), an application-specific integrated circuit (ASIC), a microprocessor, etc. The processor 602 can execute instructions 606 stored in the memory device 604 to perform operations. The instructions 606 may include processor-specific instructions generated by a compiler or an interpreter from code written in any suitable computer-programming language, such as C, C++, C#, etc. In some examples, the instructions 606 may include the control-node deployment module 104 described above.

The memory device 604 can include one memory device or multiple memory devices. The memory device 604 can be non-volatile and may include any type of memory device that retains stored information when powered off. Examples of the memory device 604 include electrically erasable and programmable read-only memory (EEPROM), flash memory, or any other type of non-volatile memory. At least some of the memory device can include a computer-readable medium from which the processor 602 can read instructions 606. A computer-readable medium can include electronic, optical, magnetic, or other storage devices capable of providing the processor 602 with computer-readable instructions or other program code. Examples of a computer-readable medium include magnetic disk(s), memory chip(s), ROM, random-access memory (RAM), an ASIC, a configured processor, optical storage, or any other medium from which a computer processor can read the instructions 606.

In some examples, the processor 602 can execute the instructions 606 to perform some or all of the operations described above. For example, the processor 602 can receive an input 124 indicating a remote location 114 at which a control node 118 is to be deployed. Based on receiving the input, the processor 602 can automatically set up the control node 118 at the remote location 114. To do so, the processor 602 can interact with the remote location 114 to deploy an instance of the control node 118 at the remote location 114. The processor 602 can also provide a configuration script 108 to the remote location 114 for use by the instance in configuring one or more managed nodes 120a-n. The processor 602 can further provide connection information 110 to the remote location 114 for use by the instance in establishing a network connection (e.g., a connection via the one or more networks 116) to the one or more managed nodes 120a-n. Once the network connection is established, the processor 602 can initiate a configuration process in which the control node 118 establishes the network connection to the one or more managed nodes 120a-n and then configures the one or more managed nodes 120a-n in accordance with the configuration script 108.

Figure 7:
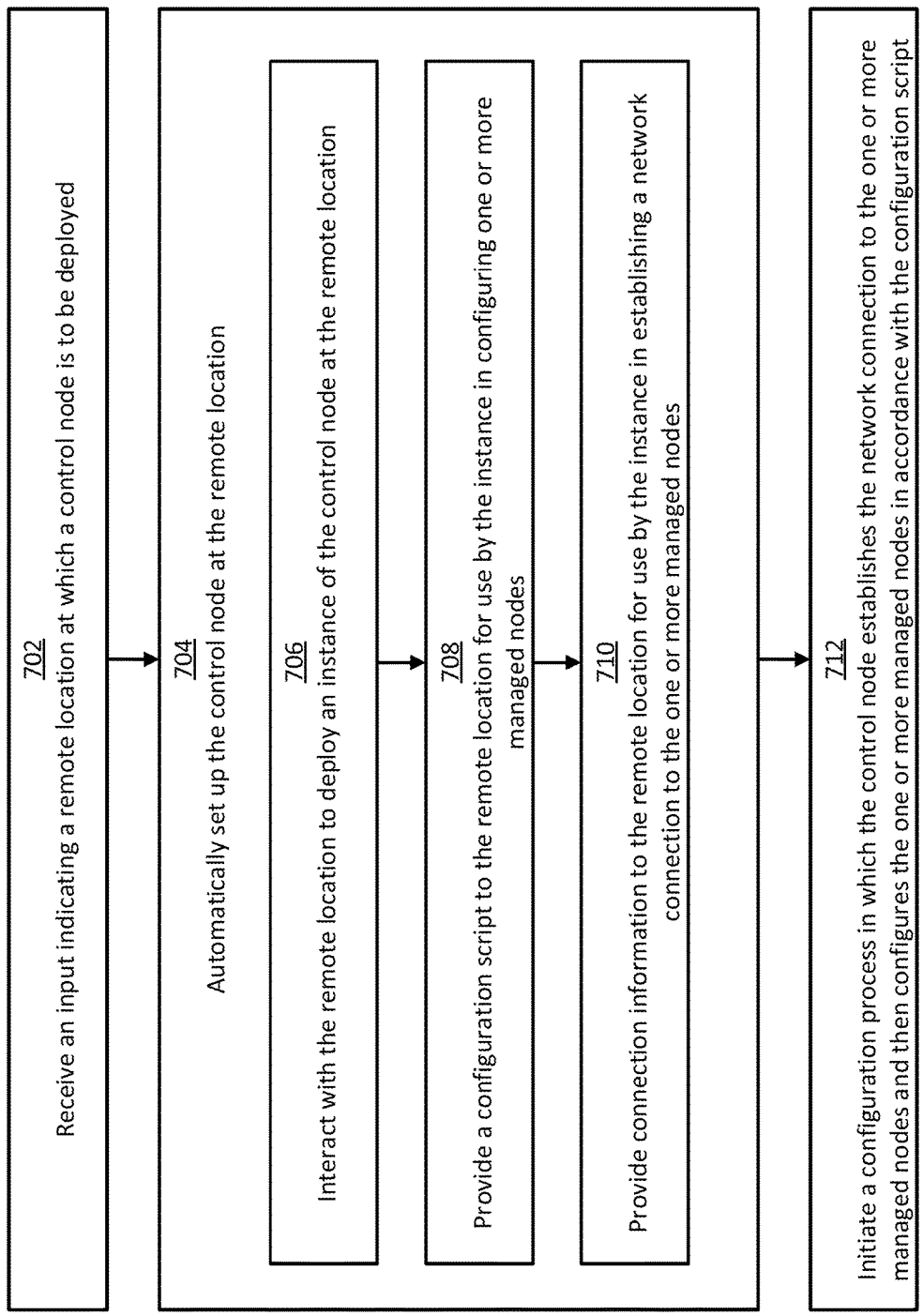
FIG. 7 is a flow chart of an example of a process for automatically deploying a control node to a remote location according to some aspects of the present disclosure.

In some examples, the processor 602 can implement the operations shown in FIG. 7. Other examples can include more steps, fewer steps, different steps, or a different combination of steps than are shown in FIG. 7. The steps of FIG. 7 are discussed below with reference to the components discussed above in relation to FIG. 6.

In block 702, the processor 602 receives an input 124 (e.g., from a user) indicating a remote location 114 at which a control node 118 is to be deployed. The input 124 may be received via a user input component, such as a keyboard, mouse, or touchscreen. The input 124 may include, for example, a name or IP address of the remote location 114.

In some examples, the input 124 can indicate a group of remote locations, where the group of remote locations may include the remote location 114 as well as other remote locations. For example, there can be multiple groups of remote locations. The remote locations in a group can have common (similar or the same) attributes. For example, all of the remote locations in a group can have a similar speed, type, service provider, or geographical location. Each group may have a name or other identifier. The input 124 may specify a target group from which the remote location 114 is to be selected. Based on receiving the input 124, the processor 602 can then select the remote location 114 from the target group. The processor 602 can select the remote location 114 from the target group randomly or based on a predefined selection criteria. In some examples, the predefined selection criteria may be configured to prioritize certain remote locations over others in the selection process. The priority for a remote location may be determined based on any number and combination of factors, such as the availability, speed, geographical location, computing resources, or capacity of the remote location. The predefined selection criteria may also take into account additional considerations or other considerations.

In block 704, the processor 602 automatically sets up the control node 118 at the remote location 114. This can involve executing sub-operations 706-710.

In block 706, the processor 602 interacts with the remote location 114 to deploy an instance of the control node 118 at the remote location 114. For example, the processor 602 can transmit control-node software to the remote location 114 via the one or more networks 116. The processor 602 may then transmit one or more commands to the remote location 114 for causing the remote location 114 to execute the control-node software.

In block 708, the processor 602 provides a configuration script 108 to the remote location 114 for use by the instance in configuring one or more managed nodes 120a-n. For example, the processor 602 can transmit the configuration script 108 to the remote location 114 via the one or more networks 116.

In block 710, the processor 602 provides connection information 110 to the remote location 114 for use by the instance in establishing a network connection (e.g., a connection via the one or more networks 116) to the one or more managed nodes 120a-n. For example, the processor 602 can transmit the connection information 110 to the remote location 114 via the one or more networks 116.

In block 712, the processor 602 initiates a configuration process in which the control node 118 establishes the network connection to the one or more managed nodes 120a-n and then configures the one or more managed nodes 120a-n in accordance with the configuration script 108. For example, the processor 602 can transmit one or more commands to the control node 118 for causing the control node 118 to establish the network connection and execute the operations specified in the configuration script 108.

Figure 8:
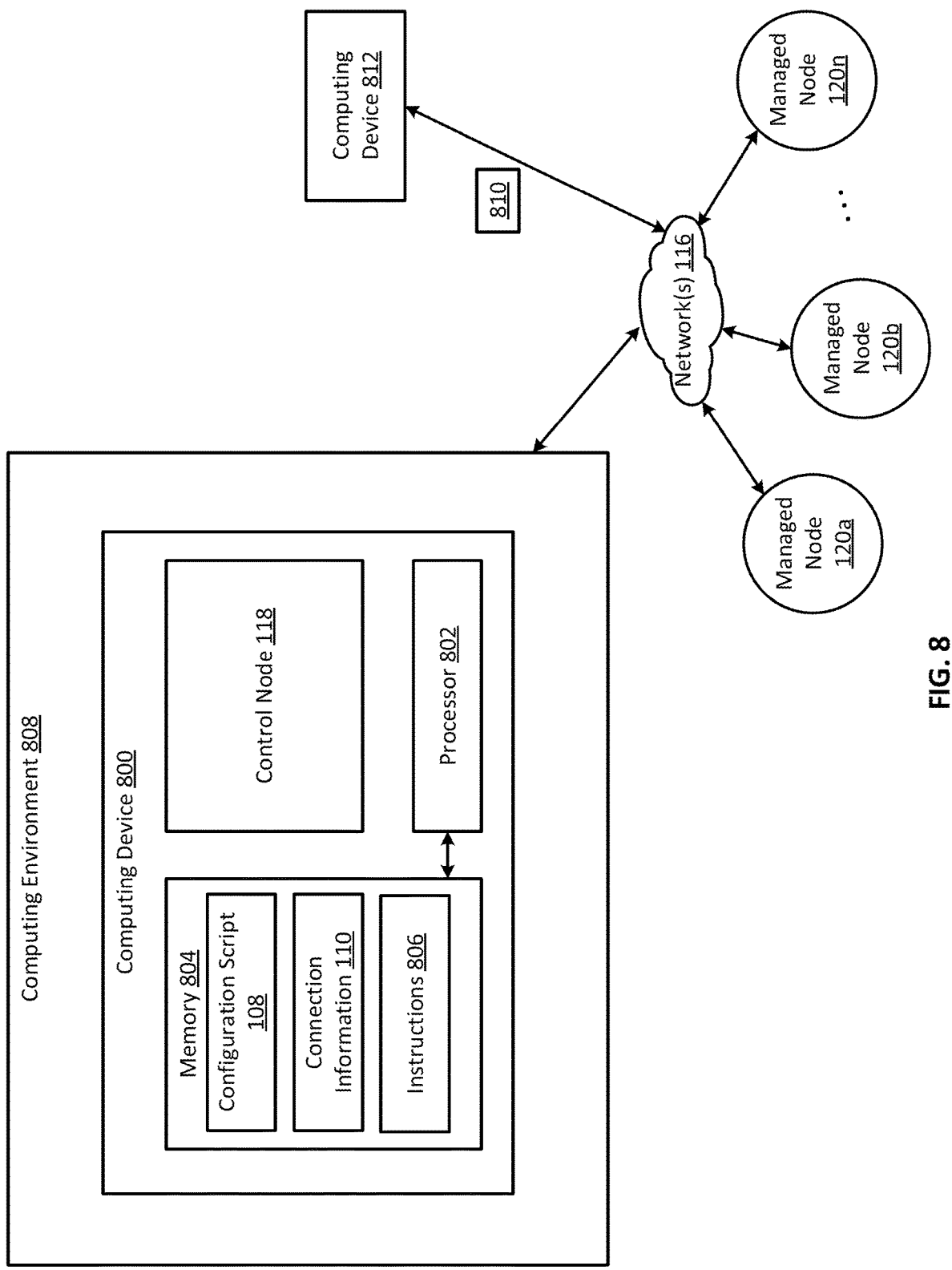
FIG. 8 is a block diagram of an example of a computing device corresponding to a control node at a remote location according to some aspects of the present disclosure.

FIG. 8 shows a block diagram of an example of a computing device 800 corresponding to a control node 118 according to some aspects of the present disclosure. The computing device 800 includes a processor 802 communicatively coupled with a memory device 804. The processor 802 can include one processing device or multiple processing devices. Examples of the processor 802 include a Field-Programmable Gate Array (FPGA), an application-specific integrated circuit (ASIC), a microprocessor, etc. The processor 802 can execute instructions 806 stored in the memory device 804 to perform operations. The instructions 806 may include processor-specific instructions generated by a compiler or an interpreter from code written in any suitable computer-programming language, such as C, C++, C#, etc.

The memory device 804 can include one memory device or multiple memory devices. The memory device 804 can be non-volatile and may include any type of memory device that retains stored information when powered off. Examples of the memory device 804 include electrically erasable and programmable read-only memory (EEPROM), flash memory, or any other type of non-volatile memory. At least some of the memory device can include a computer-readable medium from which the processor 802 can read instructions 806. A computer-readable medium can include electronic, optical, magnetic, or other storage devices capable of providing the processor 802 with computer-readable instructions or other program code. Examples of a computer-readable medium include magnetic disk(s), memory chip(s), ROM, random-access memory (RAM), an ASIC, a configured processor, optical storage, or any other medium from which a computer processor can read the instructions 806.

In some examples, the processor 802 can execute the instructions 806 to perform some or all of the operations described above. For example, the processor 802 receive a command 810 from a computing device 812, such as the user device 102 of FIG. 1. The processor 802 can receive the command 810 via one or more networks 116. The command 810 can be for deploying a control node 118 in a computing environment 808. In some examples, the computing environment 808 may be a distributed computing environment that includes multiple nodes, one of which may be computing device 800.

Based on receiving the command 810, the processor 802 can deploy an instance of the control node 118 in the computing environment 808. For example, the processor 802 can provision a virtual machine or a container with an instance of the control node 118 running therein. The processor 802 can also receive a configuration script 108 and connection information 110 (e.g., from the computing device 812). The processor 802 can then establish a network connection between the control node 118 and one or more managed nodes 120a-n based on the connection information 110. Subsequent to establishing the network connection, the processor 802 can initiate a configuration process in which the control node 118 configures the one or more managed nodes 120a-n according to the configuration script 108. Although the managed nodes 120a-n are shown as separate from the computing environment 808 in FIG. 8, it will be appreciated that in other examples the managed nodes 120a-n may be part of the computing environment 808.

Figure 9:
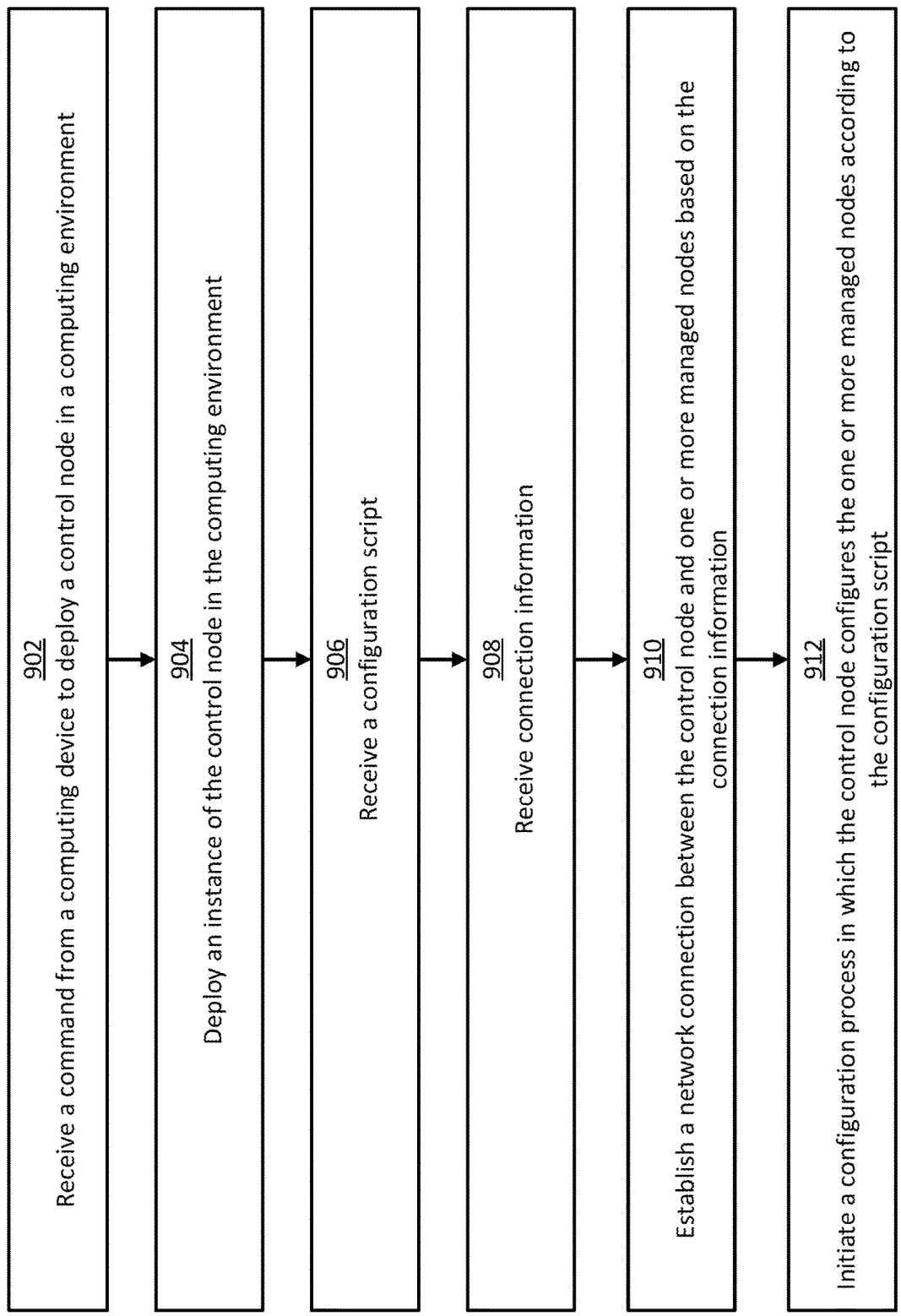
FIG. 9 is a flow chart of another example of a process for automatically deploying a control node to a remote location according to some aspects of the present disclosure.

In some examples, the processor 802 can implement the operations shown in FIG. 9. Other examples can include more steps, fewer steps, different steps, or a different combination of steps than are shown in FIG. 9. The steps of FIG. 9 are discussed below with reference to the components discussed above in relation to FIG. 8.

In block 902, the processor 802 receives a command 810 from a computing device 812 to deploy a control node 118 in a computing environment 808. The processor 802 can be part of a computing device 800 that can be considered a remote location with respect to the computing device 812. In some examples, the computing environment 808 may be a distributed computing environment that includes multiple nodes, one of which may be the computing device 800.

In block 904, the processor 802 deploys an instance of the control node 118 in the computing environment 808. For example, the processor 802 can provision a virtual machine or a container with an instance of the control node 118 running therein.

In block 906, the processor 802 receives a configuration script 108 (e.g., from the computing device 812). The processor 802 can receive the configuration script 108 via the one or more networks 116. The configuration script 108 can include one configuration script 108 or multiple configuration scripts. The configuration script 108 specifies operations to be performed by the control node 118 to configure at least one aspect of at least one managed node.

In block 908, the processor 802 receives a connection information 110 (e.g., from the computing device 812). The processor 802 can receive the connection information 110 via the one or more networks 116. The connection information 110 is information usable to establish a network connection with the one or more managed nodes 120a-n.

In block 910, the processor 802 establishes a network connection between the control node 118 and one or more managed nodes 120a-n based on the connection information 110. For example, the connection information 110 may include an IP address and a set of authentication data (e.g., a user name and password). The processor 802 can use the IP address and the set of authentication data to establish a network connection with each managed node 120a-n via the one or more networks 116.

In block 912, the processor 802 can initiate a configuration process in which the control node 118 configures the one or more managed nodes 120a-n according to the configuration script 108. For example, the processor 802 can execute the operations defined in the configuration script 108 to configure one or more aspects of the one or more managed nodes 120a-n. The processor 802 may execute the operations sequentially or in parallel. Some aspects of the managed nodes 120a-n that can be configured include, for example, their operating systems, application software, libraries, runtime environment variables, network configurations, or any combination of these.

In some aspects, control nodes can be automatically deployed at remote locations in computing environments according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by a processor for causing the processor to: receive an input indicating a remote location at which a control node is to be deployed; based on receiving the input, automatically set up the control node at the remote location by: interacting with the remote location to deploy an instance of the control node at the remote location; providing a configuration script to the remote location for use by the instance in configuring one or more managed nodes; and providing connection information to the remote location for use by the instance in establishing a network connection to the one or more managed nodes; and initiate a configuration process in which the control node establishes the network connection to the one or more managed nodes and then configures the one or more managed nodes in accordance with the configuration script.

Example #2: The non-transitory computer-readable medium of Example #1, further comprising program code that is executable by the processor for causing the processor to automatically set up the control node at the remote location by: providing a configuration file to the remote location for configuring the instance of the control node at the remote location, the configuration file being different from the configuration script and being specifically for configuring the control node.

Example #3: The non-transitory computer-readable medium of any of Examples #1-2, wherein the connection information includes a respective identifier for each managed node among the one or more managed nodes.

Example #4: The non-transitory computer-readable medium of any of Examples #1-3, wherein the connection information includes authentication data for use by the instance of the control node in an authentication process with the one or more managed nodes, the one or more managed nodes requiring the authentication process to be completed before allowing the control node to configure the one or more managed nodes.

Example #5: The non-transitory computer-readable medium of any of Examples #1-4, further comprising program code that is executable by the processor for causing the processor to interact with the remote location to deploy the instance of the control node at the remote location by: interacting with the remote location to provision a virtual machine or a container at the remote location; providing a binary file for the control node to the remote location; and interacting with the remote location for causing the binary file to be executed within the virtual machine or the container, such that the instance of the control node is deployed within the virtual machine or the container.

Example #6: The non-transitory computer-readable medium of any of Examples #1-5, wherein the control node is included in a same computing environment as the one or more managed nodes.

Example #7: The non-transitory computer-readable medium of any of Examples #1-6, further comprising program code that is executable by the processor for causing the processor to: subsequent to initiating the configuration process, receive log data from the instance of the control node, the log data describing events logged by the control node in relation to the configuration process.

Example #8: The non-transitory computer-readable medium of any of Examples #1-7, further comprising program code that is executable by the processor for causing the processor to: determining that the control node is to be moved to a new remote location; and based on determining that the control node is to be moved to the new remote location: generating another instance of the control node at the new remote location by: interacting with the new remote location to deploy a new instance of the control node at the new remote location; providing the configuration script to the new remote location for use by the new instance; and providing the connection information to the new remote location for use by the new instance; and interacting with the remote location to shut down the instance of the control node.

Example #9: The non-transitory computer-readable medium of any of Examples #1-8, further comprising program code that is executable by the processor for causing the processor to determine that the control node is to be moved to a new remote location based on a characteristic of the remote location or an event in the remote location.

Example #10: The non-transitory computer-readable medium of any of Examples #1-9, further comprising program code that is executable by the processor for causing the processor to: determine that at least two instances of the control node are to be deployed in at least two remote locations; based on determining that the at least two instances of the control node are to be deployed in the at least two remote locations: automatically deploy the instance of the control node at the remote location, the instance being a first instance of the control node and the remote location being a first remote location of the at least two remote locations; and automatically deploy a second instance of the control node at a second remote location of the at least two remote locations; and interact with the at least two remote locations for causing the at least two instances to perform aspects of the configuration process in parallel to one another.

Example #11: The non-transitory computer-readable medium of Example #10, wherein the first remote location is located geographically closer to a first managed node of the one or more managed nodes than the second remote location, and wherein the second remote location is located geographically closer to a second managed node of the one or more managed nodes than the first remote location, the first remote location and the second remote location being selected based on their respective geographical proximities to the first managed node and the second managed node, the first instance at the first remote location being configured to manage the first managed node and the second instance at the second remote location being configured to manage the second managed node.

Example #12: The non-transitory computer-readable medium of any of Examples #1-11, further comprising program code that is executable by the processor for causing the processor to: receive control data from the control node based on the configuration script; and transmit the control data to the one or more managed nodes, such that the processor serves as an intermediary between the control node and the one or more managed nodes.

Example #13: The non-transitory computer-readable medium of any of Examples #1-12, wherein the input indicates a group of remote locations, and further comprising program code that is executable by the processor for causing the processor to select the remote location from the group of remote locations according to predefined selection criteria.

Example #14: A method comprising: receiving, by a processor, an input indicating a remote location at which a control node is to be deployed; based on receiving the input, automatically setting up, by the processor, the control node at the remote location by: interacting with the remote location to deploy an instance of the control node at the remote location; providing a configuration script to the remote location for use by the instance in configuring one or more managed nodes; and providing connection information to the remote location for use by the instance in establishing a network connection to the one or more managed nodes; and initiating, by the processor, a configuration process in which the control node establishes the network connection to the one or more managed nodes and then configures the one or more managed nodes in accordance with the configuration script.

Example #15: The method of Example #14, further comprising automatically setting up the control node at the remote location by: providing a configuration file to the remote location for configuring the instance of the control node at the remote location, the configuration file being different from the configuration script and being specifically for configuring the control node.

Example #16: The method of any of Examples #14-15, further comprising: determining that the control node is to be moved to a new remote location; and based on determining that the control node is to be moved to the new remote location: generating another instance of the control node at the new remote location by: interacting with the new remote location to deploy a new instance of the control node at the new remote location; providing the configuration script to the new remote location for use by the new instance; and providing the connection information to the new remote location for use by the new instance; and interacting with the remote location to shut down the instance of the control node.

Example #17: The method of any of Examples #14-16, further comprising: determining that at least two instances of the control node are to be deployed in at least two remote locations; based on determining that the at least two instances of the control node are to be deployed in the at least two remote locations: automatically deploying the instance of the control node at the remote location, the instance being a first instance of the control node and the remote location being a first remote location of the at least two remote locations; and automatically deploying a second instance of the control node at a second remote location of the at least two remote locations; and interacting with the at least two remote locations for causing the at least two instances to perform aspects of the configuration process in parallel to one another.

Example #18: The method of any of Examples #14-17, further comprising: receiving control data from the control node based on the configuration script; and transmitting the control data to the one or more managed nodes, such that the processor serves as an intermediary between the control node and the one or more managed nodes.

Example #19: The method of any of Examples #14-18, further comprising: subsequent to initiating the configuration process, receiving log data from the instance of the control node, the log data describing events logged by the control node in relation to the configuration process.

Example #20: A system comprising: a processor; and a memory including instructions that are executable by the processor for causing the processor to: receive an input indicating a remote location at which a control node is to be deployed; based on receiving the input, automatically set up the control node at the remote location by: interacting with the remote location to deploy an instance of the control node at the remote location; providing a configuration script to the remote location for use by the instance in configuring one or more managed nodes; and providing connection information to the remote location for use by the instance in establishing a network connection to the one or more managed nodes; and initiate a configuration process in which the control node establishes the network connection to the one or more managed nodes and then configures the one or more managed nodes in accordance with the configuration script.

Example #21: A non-transitory computer-readable medium comprising program code that is executable by a processor for causing the processor to: receive a command from a computing device to deploy a control node in a computing environment; based on receiving the command, deploy an instance of the control node in the computing environment; receive a configuration script from the computing device; receive connection information from the computing device; establish a network connection between the control node and one or more managed nodes based on the connection information; and subsequent to establishing the network connection, initiate a configuration process in which the control node configures the one or more managed nodes according to the configuration script.

Example #22: The non-transitory computer-readable medium of Example #21, further comprising program code that is executable by the processor for causing the processor to, prior to initiating the configuration process: receive a configuration file from the computing device, the configuration file being different from the configuration script and being specific to configuring the control node; and configure the instance of the control node based on the configuration script.

Example #23: The non-transitory computer-readable medium of any of Examples #21-22, wherein the connection information includes a respective identifier for each managed node among the one or more managed nodes.

Example #24: The non-transitory computer-readable medium of any of Examples #21-23, wherein the connection information includes authentication data for use by the instance of the control node in an authentication process with the one or more managed nodes, the one or more managed nodes requiring the authentication process to be completed before allowing the control node to configure the one or more managed nodes.

Example #25: The non-transitory computer-readable medium of any of Examples #21-24, further comprising program code that is executable by the processor for causing the processor to, in response to receiving the command: provision a virtual machine or a container in the computing environment; receive a binary file for the control node from the computing device; and execute the binary file within the virtual machine or the container, such that the instance of the control node is deployed within the virtual machine or the container in the computing environment.

Example #26: The non-transitory computer-readable medium of any of Examples #21-25, wherein the control node is part of a managed node among the one or more managed nodes.

Example #27: The non-transitory computer-readable medium of any of Examples #21-26, further comprising program code that is executable by the processor for causing the processor to: generate log data during the configuration process, the log data describing events logged by the control node in relation to the configuration process; and transmit the log data to the computing device.

Example #28: The non-transitory computer-readable medium of any of Examples #21-27, further comprising program code that is executable by the processor for causing the processor to: receive another command to shut down the instance of the control node; and in response to receiving the other command, shut down the instance of the control node.

Example #29: The non-transitory computer-readable medium of any of Examples #21-28, further comprising program code that is executable by the processor for causing the processor to: transmit control data to the computing device based on the configuration script, the computing device being configured to relay the control data to the one or more managed nodes, such that the computing device serves as an intermediary between the control node and the one or more managed nodes.

Example #30: A method comprising: receiving, by a processor, a command from a computing device to deploy a control node in a computing environment; based on receiving the command, deploying, by the processor, an instance of the control node in the computing environment; receiving, by the processor, a configuration script from the computing device; receiving, by the processor, connection information from the computing device; establishing, by the processor, a network connection between the control node and one or more managed nodes based on the connection information; and subsequent to establishing the network connection, initiating, by the processor, a configuration process in which the control node configures the one or more managed nodes according to the configuration script.

Example #31: The method of Example #30, further comprising, prior to initiating the configuration process: receiving a configuration file from the computing device, the configuration file being different from the configuration script and being specific to configuring the control node; and configuring the instance of the control node based on the configuration script.

Example #32: The method of any of Examples #30-31, wherein the connection information includes a respective identifier for each managed node among the one or more managed nodes.

Example #33: The method of any of Examples #30-32, wherein the connection information includes authentication data for use by the instance of the control node in an authentication process with the one or more managed nodes, the one or more managed nodes requiring the authentication process to be completed before allowing the control node to configure the one or more managed nodes.

Example #34: The method of any of Examples #30-33, further comprising, in response to receiving the command: provisioning a virtual machine or a container in the computing environment; receiving a binary file for the control node from the computing device; and executing the binary file within the virtual machine or the container, such that the instance of the control node is deployed within the virtual machine or the container in the computing environment.

Example #35: The method of any of Examples #30-34, wherein the control node is part of a managed node among the one or more managed nodes.

Example #36: The method of any of Examples #30-35, further comprising: generating log data during the configuration process, the log data describing events logged by the control node in relation to the configuration process; and transmitting the log data to the computing device.

Example #37: The method of any of Examples #30-36, further comprising: receiving another command to shut down the instance of the control node; and in response to receiving the other command, shutting down the instance of the control node.

Example #38: The method of any of Examples #30-37, further comprising: transmitting control data to the computing device based on the configuration script, the computing device being configured to relay the control data to the one or more managed nodes, such that the computing device serves as an intermediary between the control node and the one or more managed nodes.

Example #39: A system comprising: a processor; and a memory including instructions that are executable by the processor for causing the processor to: receive a command from a computing device to deploy a control node in a computing environment; based on receiving the command, deploy an instance of the control node in the computing environment; receive a configuration script from the computing device; receive connection information from the computing device; establish a network connection between the control node and one or more managed nodes based on the connection information; and subsequent to establishing the network connection, initiate a configuration process in which the control node configures the one or more managed nodes according to the configuration script.

Example #40: A system comprising: means for receiving an input indicating a remote location at which a control node is to be deployed; means for, based on receiving the input, automatically setting up the control node at the remote location by: interacting with the remote location to deploy an instance of the control node at the remote location; providing a configuration script to the remote location for use by the instance in configuring one or more managed nodes; and providing connection information to the remote location for use by the instance in establishing a network connection to the one or more managed nodes; and means for initiating a configuration process in which the control node establishes the network connection to the one or more managed nodes and then configures the one or more managed nodes in accordance with the configuration script.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example described herein can be combined with any other examples to yield further examples.

The invention claimed is:

1. A non-transitory computer-readable medium comprising program code that is executable by a processor for causing the processor to:
receive an input indicating a remote location at which a control node is to be deployed;
based on receiving the input, automatically set up the control node at the remote location by:
interacting with the remote location to deploy an instance of the control node at the remote location;
transmitting a configuration script to the remote location for use by the instance in configuring one or more managed nodes; and
providing connection information to the remote location for use by the instance in establishing a network connection to the one or more managed nodes; and
initiate a configuration process in which the control node establishes the network connection to the one or more managed nodes and then the control node configures the one or more managed nodes by executing the configuration script.

2. The non-transitory computer-readable medium of claim 1, further comprising program code that is executable by the processor for causing the processor to automatically set up the control node at the remote location by:
providing a configuration file to the remote location for configuring the instance of the control node at the remote location, the configuration file being different from the configuration script and being specifically for configuring the control node.

3. The non-transitory computer-readable medium of claim 1, wherein the connection information includes a respective identifier for each managed node among the one or more managed nodes.

4. The non-transitory computer-readable medium of claim 3, wherein the connection information includes authentication data for use by the instance of the control node in an authentication process with the one or more managed nodes, the one or more managed nodes requiring the authentication process to be completed before allowing the control node to configure the one or more managed nodes.

5. The non-transitory computer-readable medium of claim 1, further comprising program code that is executable by the processor for causing the processor to interact with the remote location to deploy the instance of the control node at the remote location by:
interacting with the remote location to provision a virtual machine or a container at the remote location;
providing a binary file for the control node to the remote location; and
interacting with the remote location for causing the binary file to be executed within the virtual machine or the container, such that the instance of the control node is deployed within the virtual machine or the container.

6. The non-transitory computer-readable medium of claim 1, wherein the control node is included in a same computing environment as the one or more managed nodes.

7. The non-transitory computer-readable medium of claim 1, further comprising program code that is executable by the processor for causing the processor to:
subsequent to initiating the configuration process, receive log data from the instance of the control node, the log data describing events logged by the control node in relation to the configuration process.

8. The non-transitory computer-readable medium of claim 1, further comprising program code that is executable by the processor for causing the processor to:
determining that the control node is to be moved to a new remote location; and
based on determining that the control node is to be moved to the new remote location:
generating another instance of the control node at the new remote location by:

interacting with the new remote location to deploy a new instance of the control node at the new remote location;
providing the configuration script to the new remote location for use by the new instance; and
providing the connection information to the new remote location for use by the new instance; and
interacting with the remote location to shut down the instance of the control node.

9. The non-transitory computer-readable medium of claim 8, further comprising program code that is executable by the processor for causing the processor to determine that the control node is to be moved to the new remote location based on a characteristic of the remote location or an event in the remote location.

10. The non-transitory computer-readable medium of claim 1, further comprising program code that is executable by the processor for causing the processor to:
determine that at least two instances of the control node are to be deployed in at least two remote locations;
based on determining that the at least two instances of the control node are to be deployed in the at least two remote locations:
automatically deploy the instance of the control node at the remote location, the instance being a first instance of the control node and the remote location being a first remote location of the at least two remote locations; and
automatically deploy a second instance of the control node at a second remote location of the at least two remote locations; and
interact with the at least two remote locations for causing the at least two instances to perform aspects of the configuration process in parallel to one another.

11. The non-transitory computer-readable medium of claim 10, wherein the first remote location is located geographically closer to a first managed node of the one or more managed nodes than the second remote location, and wherein the second remote location is located geographically closer to a second managed node of the one or more managed nodes than the first remote location, the first remote location and the second remote location being selected based on their respective geographical proximities to the first managed node and the second managed node, the first instance at the first remote location being configured to manage the first managed node and the second instance at the second remote location being configured to manage the second managed node.

12. The non-transitory computer-readable medium of claim 1, further comprising program code that is executable by the processor for causing the processor to:
receive control data from the control node based on the configuration script; and
transmit the control data to the one or more managed nodes, such that the processor serves as an intermediary between the control node and the one or more managed nodes.

13. The non-transitory computer-readable medium of claim 1, wherein the input indicates a group of remote locations, and further comprising program code that is executable by the processor for causing the processor to select the remote location from the group of remote locations according to predefined selection criteria.

14. A method comprising:
receiving, by a processor, an input indicating a remote location at which a control node is to be deployed;
based on receiving the input, automatically setting up, by the processor, the control node at the remote location by:
interacting with the remote location to deploy an instance of the control node at the remote location;
transmitting a configuration script to the remote location for use by the instance in configuring one or more managed nodes; and
providing connection information to the remote location for use by the instance in establishing a network connection to the one or more managed nodes; and
initiating, by the processor, a configuration process in which the control node establishes the network connection to the one or more managed nodes and then the control node configures the one or more managed nodes by executing the configuration script.

15. The method of claim 14, further comprising automatically setting up the control node at the remote location by:
providing a configuration file to the remote location for configuring the instance of the control node at the remote location, the configuration file being different from the configuration script and being specifically for configuring the control node.

16. The method of claim 14, further comprising:
determining that the control node is to be moved to a new remote location; and
based on determining that the control node is to be moved to the new remote location:
generating another instance of the control node at the new remote location by:
interacting with the new remote location to deploy a new instance of the control node at the new remote location;
providing the configuration script to the new remote location for use by the new instance; and
providing the connection information to the new remote location for use by the new instance; and
interacting with the remote location to shut down the instance of the control node.

17. The method of claim 14, further comprising:
determining that at least two instances of the control node are to be deployed in at least two remote locations;
based on determining that the at least two instances of the control node are to be deployed in the at least two remote locations:
automatically deploying the instance of the control node at the remote location, the instance being a first instance of the control node and the remote location being a first remote location of the at least two remote locations; and
automatically deploying a second instance of the control node at a second remote location of the at least two remote locations; and
interacting with the at least two remote locations for causing the at least two instances to perform aspects of the configuration process in parallel to one another.

18. The method of claim 14, further comprising:
receiving control data from the control node based on the configuration script; and
transmitting the control data to the one or more managed nodes, such that the processor serves as an intermediary between the control node and the one or more managed nodes.

19. The method of claim 14, further comprising:
subsequent to initiating the configuration process, receiving log data from the instance of the control node, the log data describing events logged by the control node in relation to the configuration process.

20. A system comprising:

a processor; and a memory including instructions that are executable by the processor for causing the processor to:
- receive an input indicating a remote location at which a control node is to be deployed;
- based on receiving the input, automatically set up the control node at the remote location by:
  - interacting with the remote location to deploy an instance of the control node at the remote location;
  - transmitting a configuration script to the remote location for use by the instance in configuring one or more managed nodes; and
  - providing connection information to the remote location for use by the instance in establishing a network connection to the one or more managed nodes; and
- initiate a configuration process in which the control node establishes the network connection to the one or more managed nodes and then configures the one or more managed nodes in accordance with the configuration script.

* * * * *